United States Patent
Hanafusa et al.

(10) Patent No.: US 11,623,697 B2
(45) Date of Patent: Apr. 11, 2023

(54) VEHICLE FRONT STRUCTURE

(71) Applicant: HONDA MOTOR CO., LTD., Tokyo (JP)

(72) Inventors: Yasuo Hanafusa, Tokyo (JP); Ryo Kita, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/393,623

(22) Filed: Aug. 4, 2021

(65) Prior Publication Data

US 2022/0041226 A1 Feb. 10, 2022

(30) Foreign Application Priority Data

Aug. 6, 2020 (JP) .............................. JP2020-133908

(51) Int. Cl.
| | | |
|---|---|---|
| *B62D 25/08* | (2006.01) | |
| *B62D 25/20* | (2006.01) | |
| *B62D 25/04* | (2006.01) | |
| *B60K 26/02* | (2006.01) | |
| *B62D 21/15* | (2006.01) | |

(52) U.S. Cl.
CPC .......... *B62D 25/2018* (2013.01); *B60K 26/02* (2013.01); *B62D 25/04* (2013.01); *B62D 25/2036* (2013.01); *B62D 21/152* (2013.01)

(58) Field of Classification Search
CPC ...................................................... B62D 25/20
USPC ..................... 296/193.07, 204, 187.09, 187.1
See application file for complete search history.

(56) References Cited

U.S. PATENT DOCUMENTS

| | | |
|---|---|---|
| 2012/0001453 A1 | 1/2012 | Naoi |
| 2012/0001456 A1 | 1/2012 | Naoi |
| 2016/0052561 A1 | 2/2016 | Atsumi et al. |
| 2017/0080978 A1 | 3/2017 | Koshida et al. |
| 2019/0084514 A1 | 3/2019 | Izutsu et al. |

FOREIGN PATENT DOCUMENTS

| | | | |
|---|---|---|---|
| CN | 108657279 A | | 10/2018 |
| EP | 3114013 | * | 2/2015 |
| JP | S59-96067 A | | 6/1984 |

(Continued)

OTHER PUBLICATIONS

Office Action received in corresponding Japanese application No. 2020-133908 dated Feb. 1, 2022 with English translation (7 pages).

*Primary Examiner* — Dennis H Pedder
(74) *Attorney, Agent, or Firm* — Rankin, Hill & Clark LLP (57) ABSTRACT

A vehicle front structure includes: a pair of left and right front pillars; a front wall portion provided between the pair of left and right front pillars and forming a front end of the vehicle interior; a lower wall portion extending rearward from a lower end of the front wall portion; a tunnel member formed at a middle portion of the lower wall portion in a vehicle width direction and having an upward convex shape; and a reinforcing portion laminated on and fixed to the front wall portion or the front wall portion and the lower wall portion, in which the reinforcing portion is provided so as to be inclined downward from the front pillar toward the tunnel member and forms a thick plate portion in collaboration with the front wall portion or the front wall portion and the lower wall portion.

7 Claims, 5 Drawing Sheets (56) References Cited

FOREIGN PATENT DOCUMENTS

| | | |
|---|---|---|
| JP | 2009-286181 A | 12/2009 |
| JP | 2012-011957 A | 1/2012 |
| JP | 2012-011959 A | 1/2012 |
| JP | 2017-056869 A | 3/2017 |
| JP | 2019-051818 A | 4/2019 |
| WO | 2014162493 A1 | 10/2014 |

* cited by examiner

VEHICLE FRONT STRUCTURE

BACKGROUND

Technical Field

The present invention relates to a vehicle front structure.

Related Art

In recent years, while automobiles have been downsized, a number of parts mounted in engine rooms has been increasing due to the addition of advanced functions and the like. In addition, there has been a further demand for a technique that prevents deformation of a vehicle body such as coping with an oblique collision which is an oblique front collision at high speed. Patent Literature 1 and Patent Literature 2 describe a structure in which a frame member such as a dash cross member is disposed in a dashboard lower that separates an engine room from a vehicle interior. Such a structure generates a reaction force against an intrusion of the parts mounted in the engine room at the time of a frontal collision of a vehicle, and can prevent the dashboard lower from being deformed toward a vehicle interior.

PRIOR ART DOCUMENT(S)

Patent Literature(s)

Patent Literature 1: JP S59-096067A
Patent Literature 2: JP 2009-286181A

SUMMARY

However, the structure in which the frame member is disposed as described in Patent Literature 1 requires a space for forming a closed cross section, and thus may not be able to be adopted in a downsized vehicle.

The present invention has been made in view of the above circumstances, and an object thereof is to provide a vehicle front structure capable of achieving both collision performance and space efficiency.

In order to solve the above problem, a vehicle front structure according to the present invention includes: a pair of left and right front pillars; a front wall portion provided between the pair of left and right front pillars and forming a front end of a vehicle interior; a floor wall portion extending rearward from a lower end of the front wall portion; a tunnel portion formed at a middle portion of the floor wall portion in a vehicle width direction and having an upward convex shape; and a reinforcing portion laminated on and fixed to the front wall portion or the front wall portion and the floor wall portion, in which the reinforcing portion is provided so as to be inclined downward from the front pillar toward the tunnel portion and forms a thick plate portion in collaboration with the front wall portion or the front wall portion and the floor wall portion.

According to the present invention, the vehicle front structure can achieve both collision performance and space efficiency.

DETAILED DESCRIPTION

Hereinafter, an embodiment of the present invention will be described with reference to the drawings as appropriate, taking as an example a case where a vehicle front structure of the present invention is applied to an automobile. The same components are denoted by the same reference numerals, and redundant description will be omitted. Terms indicating directions such as top and bottom, front and rear, and left and right (vehicle width direction) are defined with respect to a vehicle and an occupant (driver) of the vehicle.

Figure 1:
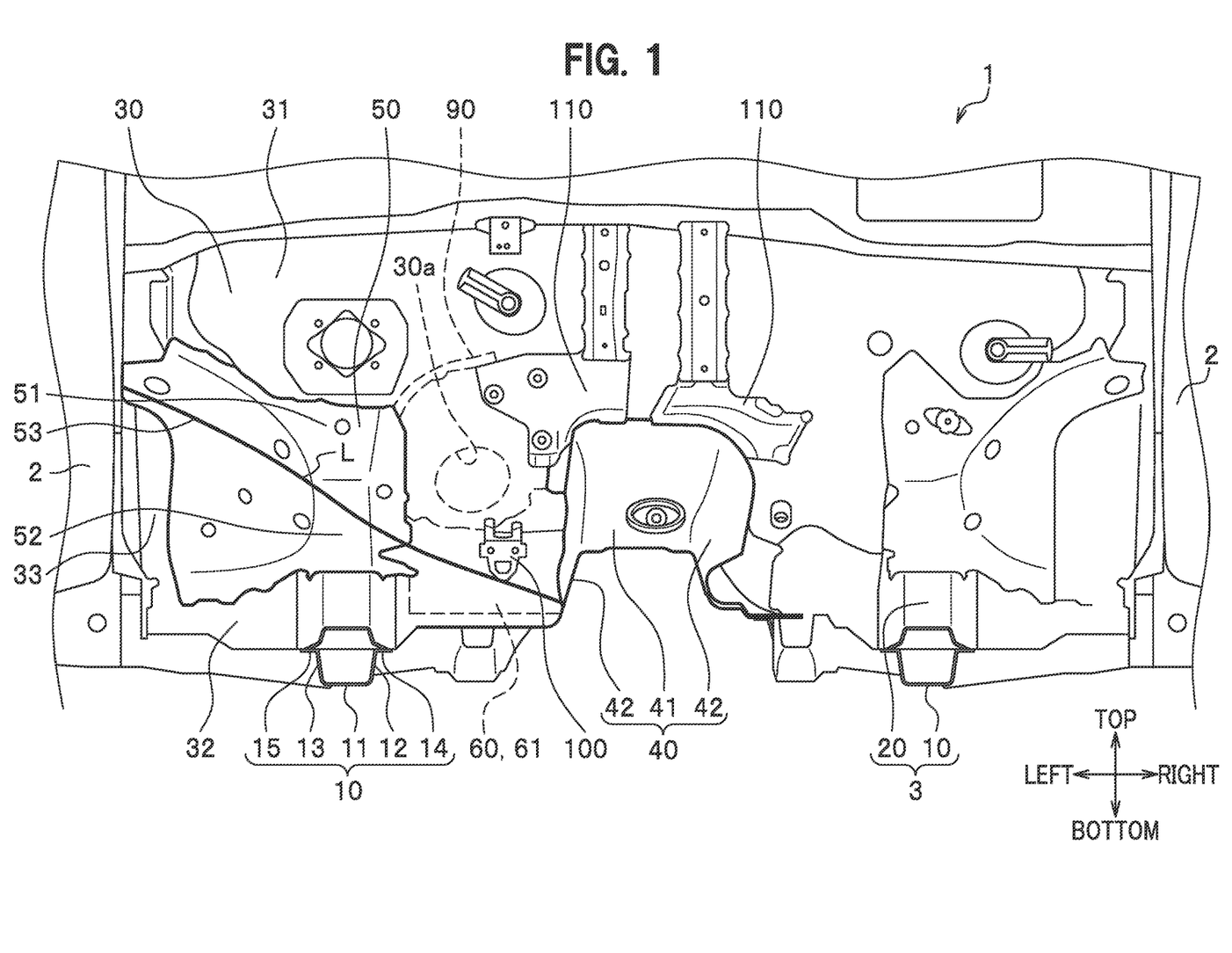
FIG. 1 is a rear view schematically illustrating a vehicle front structure according to an embodiment of the present invention.
Figure 2:
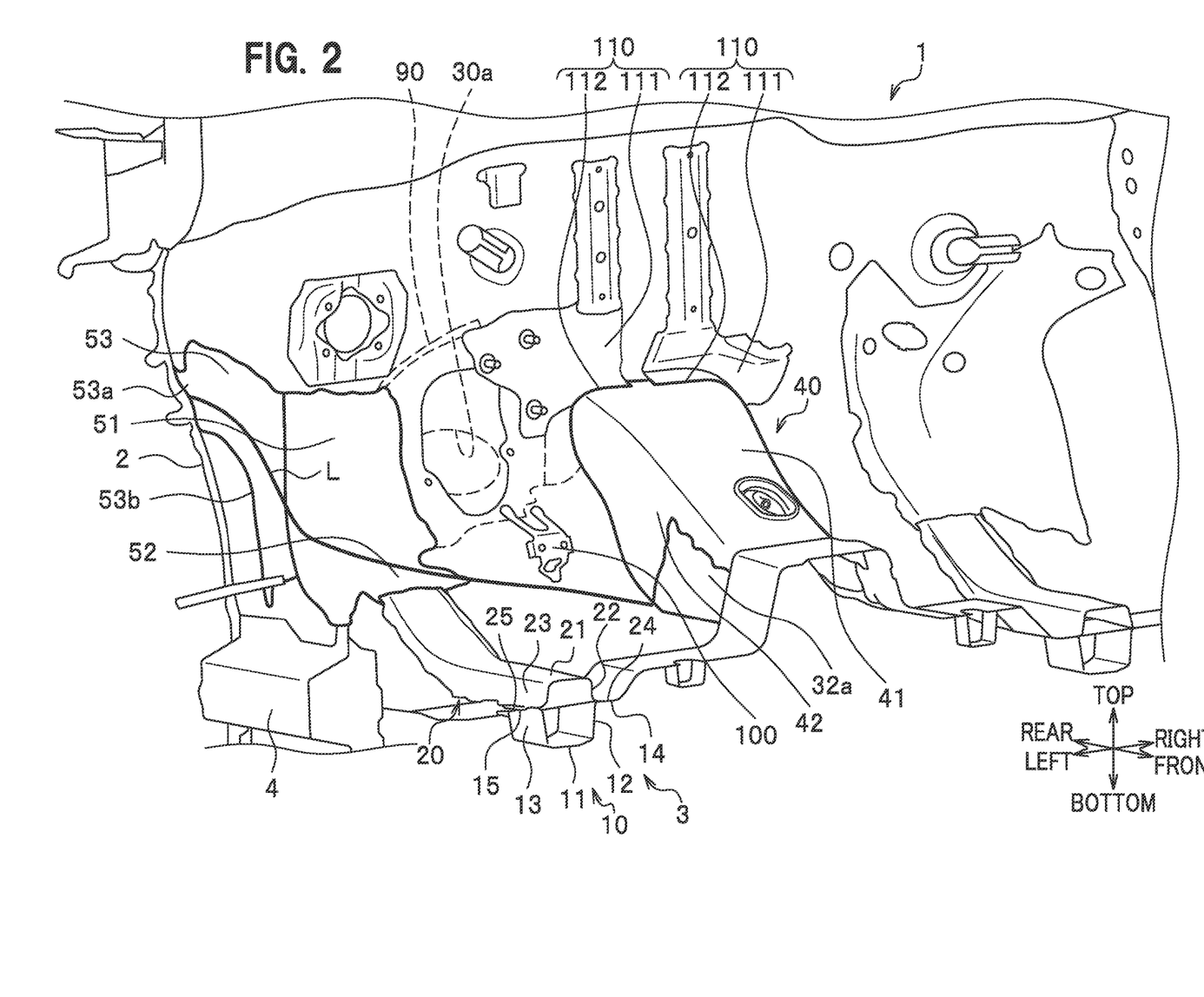
FIG. 2 is a perspective view schematically illustrating the vehicle front structure according to the embodiment of the present invention.

As illustrated in FIGS. 1 and 2, a vehicle front structure 1 according to an embodiment of the present invention includes a pair of left and right front pillars 2 and 2, a pair of left and right front side frames 3 and 3, a dashboard lower 30, and a tunnel member 40. The vehicle front structure 1 further includes a first reinforcing plate 50, a second reinforcing plate 60, a tunnel brace 70, and a tunnel reinforcement 80 (see FIG. 4). The vehicle front structure 1 further includes a steering joint cover 90, a bracket 100, and a pair of left and right reinforcing plates 110 and 110. The vehicle front structure 1 is a structure that reinforces the dashboard lower 30 by a reinforcing portion, which includes the first reinforcing plate 50 and the second reinforcing plate 60, between the tunnel member 40 and one of the front pillars 2 (the left front pillar in the present embodiment).

<Front Pillar>

As illustrated in FIG. 2, the front pillar 2 is a metal frame member extending in a top-bottom direction. The front pillar 2 has a substantially rectangular cross-sectional shape in plan view, and forms a front frame portion of an opening in which a door on a side of a vehicle body is provided. Also, upper portions of the front pillars 2 form left and right side frame portions of an opening in which a front windshield at the front of the vehicle body is provided. A lower end of the front pillar 2 is connected to a side sill 4 that is a metal frame member extending in a front-rear direction. An upper end of the front pillar 2 is connected to a roof side rail that is a metal frame member extending in the front-rear direction.

<Front Side Frame>

The front side frame 3 is a metal frame member extending in the front-rear direction at a lower portion of the vehicle body. The front side frame 3 has a substantially rectangular cross-sectional shape in a front view. A front end of the front side frame 3 is connected to a bumper on the front of the vehicle body. The front side frame 3 includes a front side frame lower 10 forming a lower portion of the front side frame 3, and a front side frame upper 20 forming an upper portion of the front side frame 3.

<<Front Side Frame Lower>>

The front side frame lower 10 integrally includes a lower wall portion 11, an inner wall portion 12 extending upward from an inner end of the lower wall portion 11 in the vehicle width direction, and an outer wall portion 13 extending upward from an outer end of the lower wall portion 11 in the vehicle width direction. Moreover, the front side frame lower 10 integrally includes a flange portion 14 extending inward in the vehicle width direction from an upper end of the inner wall portion 12, and a flange portion 15 extending outward in the vehicle width direction from an upper end of the outer wall portion 13. The front side frame lower 10 extends forward to a lower side of a lower wall reinforcing portion 52 and a front side of a front wall reinforcing portion 51 of a first reinforcing plate 50 described later.

<<Front Side Frame Upper>>

The front side frame upper 20 integrally includes an upper wall portion 21, an inner wall portion 22 extending downward from an inner end of the upper wall portion 21 in the vehicle width direction, and an outer wall portion 23 extending downward from an outer end of the upper wall portion 21 in the vehicle width direction. Moreover, the front side frame upper 20 integrally includes a flange portion 24 extending inward in the vehicle width direction from a lower end of the inner wall portion 22, and a flange portion 25 extending outward in the vehicle width direction from a lower end of the outer wall portion 23. The front side frame upper 20 extends forward to a rear end of the lower wall reinforcing portion 52 of the first reinforcing plate 50 described later.

The front side frame lower 10 and the front side frame upper 20 are connected to each other while sandwiching a lower wall portion 32 of the dashboard lower 30 (described later) therebetween in the top-bottom direction. That is, the flange portion 14, the lower wall portion 32, and the flange portion 24 are joined by welding or the like, and the flange portion 15, the lower wall portion 32, and the flange portion 25 are joined by welding or the like.

<Dashboard Lower>

The dashboard lower 30 is a metal plate member installed between lower portions of the pair of left and right front pillars 2 and 2. The dashboard lower 30 integrally includes a front wall portion 31 extending in the top-bottom direction and left-right direction, the lower wall portion (bottom wall portion) 32 extending rearward from a lower end of the front wall portion 31, and wheel arch portions 33 and 33.

<<Front Wall Portion>>

The front wall portion 31 separates a power source room (engine room) formed on a front side of the front wall portion 31 and the vehicle interior formed on a rear side of the front wall portion 31.

<<Lower Wall Portion (Bottom Wall Portion)>>

The lower wall portion 32 forms a front end of a floor surface portion of the vehicle interior. A front end of the lower wall portion 32 is curved so as to have an R shape that is convex downward in a side view. Such a curved area is a boundary portion with the front wall portion 31, and can also be regarded as a lower end of the front wall portion 31. The lower wall portion 32 is divided into left and right portions at a center portion in the vehicle width direction. A flange portion 32a extending upward is formed at an inner end, in the vehicle width direction, of each of the lower wall portions 32 divided into the left and right portions.

<<Wheel Arch Portion>>

The wheel arch portion 33 is formed across the front wall portion 31 and the lower wall portion 32 at each of both ends of the dashboard lower 30 in the vehicle width direction. The wheel arch portion 33 forms a rear portion of a wheel housing in which left and right front wheels of the vehicle are accommodated, and is recessed rearward and inward in the vehicle width direction so as to have the shape of a ¼ sphere.

<Tunnel Member>

The tunnel member 40 is a metal plate member installed between the lower wall portions 32 and 32 divided into the left and right portions and extends in the front-rear direction. A front end of the tunnel member 40 is connected to the front wall portion 31 via the reinforcing plate 110. The tunnel member 40 integrally includes an upper wall portion 41 and side wall portions 42 and 42 extending downward from both ends of the upper wall portion 41 in the vehicle width direction. A lower end of the side wall portion 42 is joined to the corresponding flange portion 32a by welding or the like.

<First Reinforcing Plate (Wheel Arch-Side Reinforcing Plate)>

Figure 3:
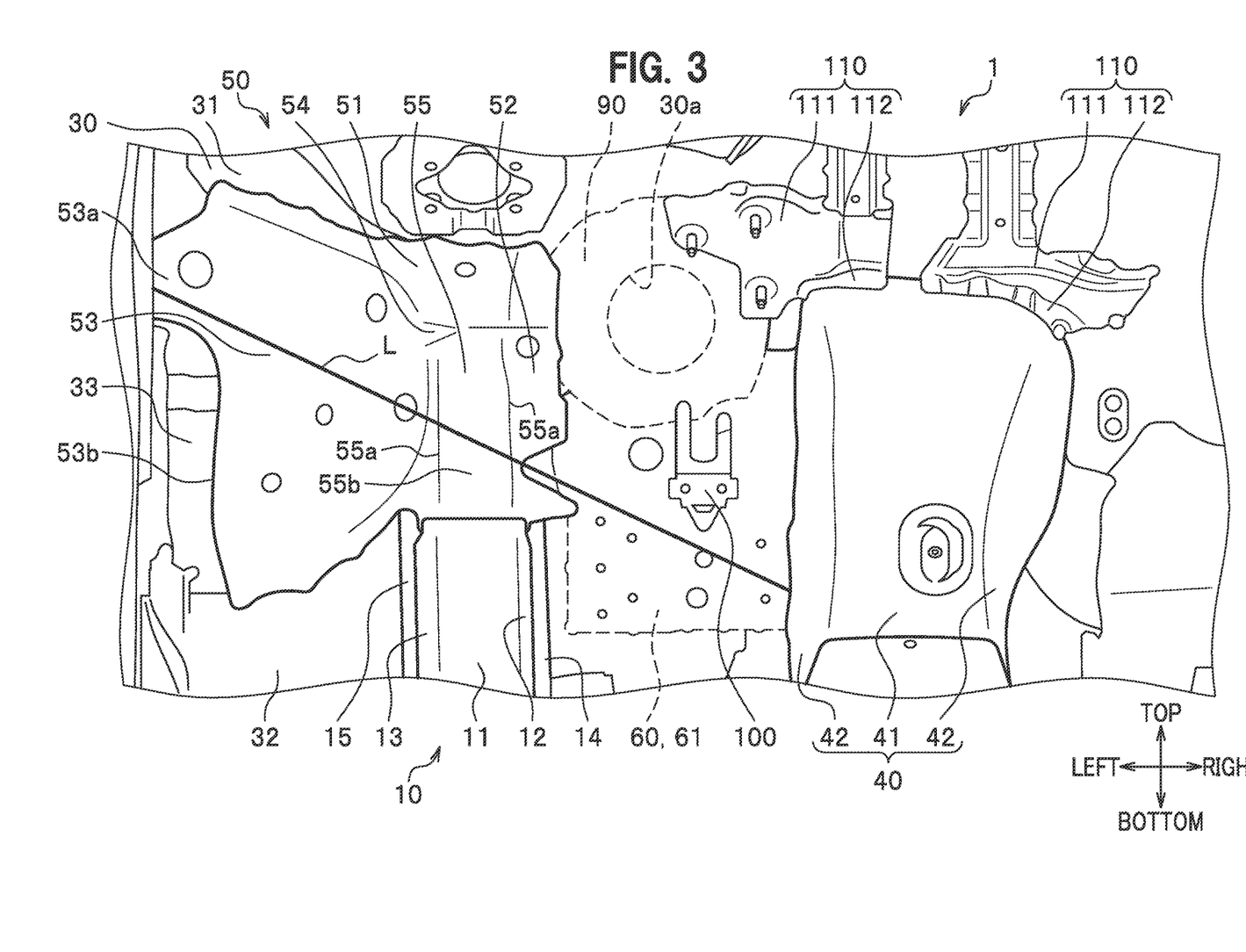
FIG. 3 is a partially enlarged view of FIG. 1.

As illustrated in FIG. 3, the first reinforcing plate 50 is a metal plate member that reinforces the dashboard lower 30 on the side of the wheel arch portion 33 in the vehicle width direction (the outer portion in the vehicle width direction). The first reinforcing plate 50 has a substantially rectangular shape in a rear view, and is laminated on the dashboard lower 30 on the side of the vehicle interior (the rear side of the front wall portion 31 and the wheel arch portion 33, and the upper side of the lower wall portion 32). The first reinforcing plate 50 is not a frame member that forms a closed cross section in collaboration with the dashboard lower 30, but is a member that is laminated on the dashboard lower 30 and fixed at a plurality of positions to form a pressure plate portion thicker than an area of the dashboard lower 30 where the first reinforcing plate 50 is not provided. The first reinforcing plate 50 integrally includes the front wall reinforcing portion 51 laminated on the front wall portion 31 and joined thereto by welding or the like, and the lower wall reinforcing portion 52 laminated on the lower wall portion 32 and joined thereto by welding or the like. In addition, the first reinforcing plate 50 integrally includes a wheel arch reinforcing portion 53 laminated on the wheel arch portion 33 and joined thereto by welding or the like, and a flat portion 54 provided at an intersection of the reinforcing portions 51 to 53. A boundary portion among the wheel arch reinforcing portion 53, the front wall reinforcing portion 51, and the lower wall reinforcing portion 52 forms a ridge line having a substantially Y-shape, and the flat portion 54 is positioned at an intersection of the ridge line.

The flat portion 54 has a triangular shape installed among the reinforcing portions 51 to 53. The flat portion 54 is inclined upward toward the outside in the vehicle width direction, and is inclined downward toward the rear.

A front side frame upper portion 55 formed by bending protrudes upward from the lower wall reinforcing portion 52. The front side frame upper portion 55 is a portion extending forward from a front end of the front side frame upper 20 and forming an upper portion of the front side frame 3. The front side frame upper portion 55 integrally includes a pair of left and right side wall portions 55a and 55a extending upward from the lower wall reinforcing portion 52, and an upper wall portion 55b connecting upper ends of the pair of left and right side wall portions 55a and 55a.

<Second Reinforcing Plate (Tunnel-Side Reinforcing Plate)>

Figure 4:
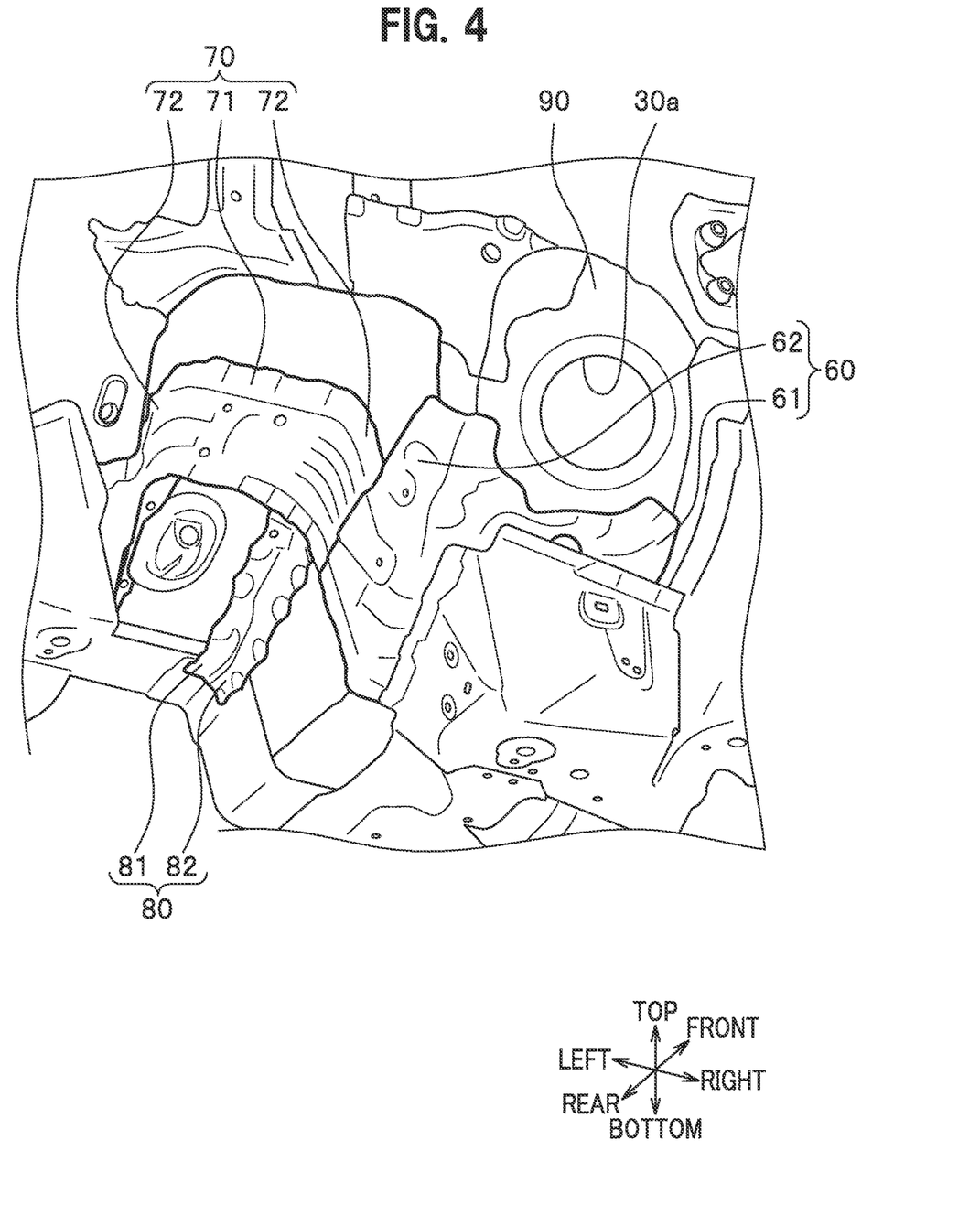
FIG. 4 is a perspective view schematically illustrating a tunnel portion of the vehicle front structure according to the embodiment of the present invention.
Figure 5:
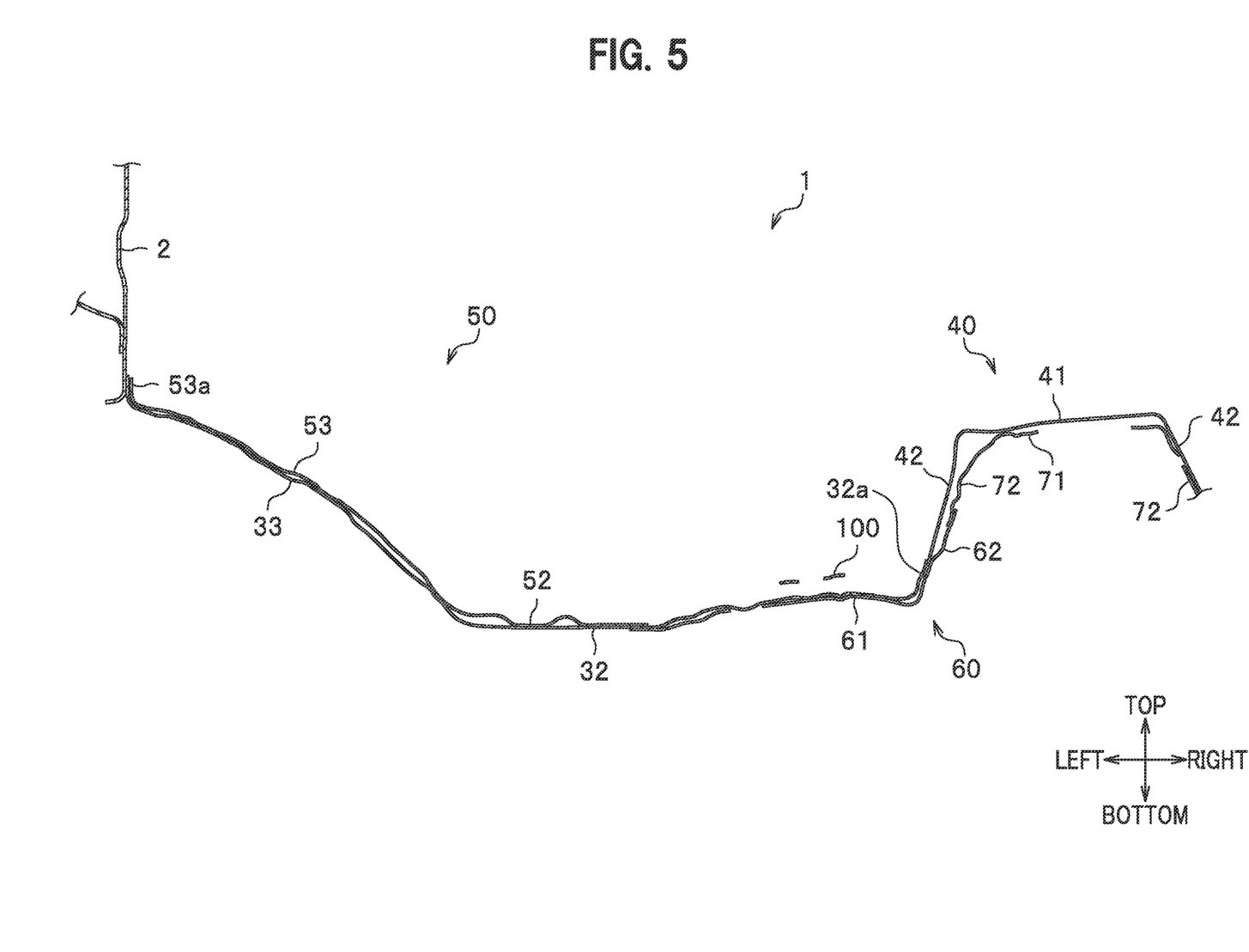
FIG. 5 is an end view schematically illustrating the vehicle front structure according to the embodiment of the present invention.

As illustrated in FIG. 4, the second reinforcing plate 60 is a metal plate member that reinforces the dashboard lower 30 on the side of the tunnel member 40 (the inner portion in the vehicle width direction). The second reinforcing plate 60 has a substantially rectangular shape in rear view, is disposed while being offset on a lower side with respect to the first reinforcing plate 50, and is provided on the dashboard lower 30 on the side of the power source room (lower side of the lower wall portion 32) in the present embodiment. The second reinforcing plate 60 is not a frame member that forms a closed cross section in collaboration with the dashboard lower 30, but is a member that is laminated on the dashboard lower 30 and fixed at a plurality of positions to form a pressure plate portion thicker than an area of the dashboard lower 30 where the second reinforcing plate 60 is not provided. The second reinforcing plate 60 integrally includes a lower wall reinforcing portion 61 laminated on the lower wall portion 32 and joined thereto by welding or the like, and a tunnel reinforcing portion 62 laminated on the side wall portion 42 of the tunnel member 40 and joined thereto by welding or the like. An outer end of the lower wall reinforcing portion 61 in the vehicle width direction is joined to the lower wall reinforcing portion 52 of the first reinforcing plate 50 by welding or the like via the lower wall portion 32 on the inner side in the vehicle width direction relative to the front side frame 3.

The second reinforcing plate 60 is smaller than the first reinforcing plate 50. The second reinforcing plate 60 is formed to have higher strength against a frontal collision load per unit area than that of the first reinforcing plate 50, and is connected to the steering joint cover 90 as described later. That is, the second reinforcing plate 60 whose area is reduced by being connected to the steering joint cover 90 is formed of a plate material (high-strength steel plate) having higher strength than that of the first reinforcing plate 50 in order to prevent deformation of the dashboard lower 30 toward the rear or inward and rearward in the vehicle width direction. With such a configuration, the second reinforcing plate 60 can achieve the strength equivalent to that of the first reinforcing plate 50 against the frontal collision load in collaboration with the steering joint cover 90.

<Tunnel Brace (Tunnel Reinforcing Plate)>

The tunnel brace 70 is a metal plate member that reinforces the tunnel member 40. The tunnel brace 70 is laminated on a vehicle exterior side (lower surface) of the tunnel member 40. The tunnel brace 70 integrally includes an upper wall portion 71 and side wall portions 72 and 72 extending downward from both ends of the upper wall portion 71 in the vehicle width direction. The upper wall portion 71 is joined to the upper wall portion 41 of the tunnel member 40 by welding or the like, and the side wall portions 72 are joined to the corresponding side wall portions 42 of the tunnel member 40 by welding or the like. A lower end of one of the side wall portions 72 is sandwiched between an upper end of the tunnel reinforcing portion 62 of the second reinforcing plate 60 and the corresponding side wall portion 42 of the tunnel member 40, and is joined thereto by welding or the like.

<Tunnel Reinforcement (Tunnel Reinforcing Plate)>

The tunnel reinforcement 80 is a metal plate member that extends in the front-rear direction on a rear side of the tunnel brace 70 and reinforces a corner of the tunnel member 40. The tunnel reinforcement 80 is divided into left and right portions while being laminated on the vehicle exterior side of the tunnel member 40 across the upper wall portion 41 and the side wall portions 42. The tunnel reinforcement 80 integrally includes an upper wall portion 81 and a side wall portion 82 extending downward from an end of the upper wall portion 81 in the vehicle width direction. A front end of the upper wall portion 81 is sandwiched between the upper wall portion 71 of the tunnel brace 70 and the upper wall portion 41 of the tunnel member 40, and is joined thereto by welding or the like. A front end of the side wall portion 82 is sandwiched between the side wall portion 72 of the tunnel brace 70 and the side wall portion 42 of the tunnel member 40, and is joined thereto by welding or the like.

<Steering Joint Cover>

The steering joint cover 90 is a metal member laminated on the front wall portion 31 on the side of the power source room so as to surround a hole 30a. The steering joint cover 90 is a member that covers and protects a steering joint inserted into the hole 30a. A lower end of the steering joint cover 90 is sandwiched between the second reinforcing plate 60 and the lower wall portion 32, and is joined thereto by welding or the like. The hole 30a is formed across the front wall portion 31 and the lower wall portion 32, but may be formed in any one of the front wall portion 31 and the lower wall portion 32.

<Bracket>

The bracket 100 is provided on the lower wall portion 32 on the side of the vehicle interior, and regulates a path (direction and range of movement (limit of movement in a stepping direction)) of an accelerator pedal stepped on by a driver. The bracket 100 is joined to the lower wall portion 32 and the second reinforcing plate 60 laminated on the lower wall portion 32 by welding or the like.

<Reinforcing Plate>

The reinforcing plate 110 is a metal plate member that is provided on the front wall portion 31 on the side of the vehicle interior and reinforces the periphery of an area of the front wall portion 31 connected to the tunnel member 40. The reinforcing plate 110 integrally includes a main wall portion 111 and a flange portion 112 extending rearward from a lower end of the main wall portion 111, and is divided into left and right portions. The main wall portion 111 is joined to the front wall portion 31 and the steering joint cover 90 by welding or the like, and the flange portion 112 is joined to a front end of the upper wall portion 41 of the tunnel member 40 by welding or the like.

<Preventing Deformation of Dashboard Lower at the Time of Frontal Collision of Vehicle>

At the time of a frontal collision of the vehicle, a part mounted in the power source room (such as a transmission) comes into contact with a lower end of the dashboard lower 30 (a region from the lower end of the front wall portion 31 to the curved area of the lower wall portion 32). Here, the first reinforcing plate 50 and the second reinforcing plate 60 form a reinforcing portion inclined downward from the front pillar 2 to the tunnel member 40 (see a curve L in FIGS. 1 and 2). The reinforcing portion is installed between the front pillar 2 and the tunnel member 40, and forms a thick portion in collaboration with the dashboard lower 30. The reinforcing portion can thus prevent rearward deformation of the dashboard lower 30. Since the curved area of the lower wall portion 32 is an area where an occupant places his/her foot, the reinforcing portion can eliminate an impact on the ankle of the occupant. In addition, the reinforcing portion can save space compared to the frame member. Moreover, in the vehicle front structure 1, when a mounted part (such as a brake master cylinder) collides with the front wall portion 31 above the front wall reinforcing portion 51, the collision load can be dispersed from the front wall reinforcing portion 51 to the lower wall reinforcing portion 52 and the wheel arch reinforcing portion 53 so that, for example, the retraction of a brake pedal can be prevented.

The vehicle front structure 1 according to the embodiment of the present invention includes: the pair of left and right front pillars 2 and 2; the front wall portion 31 provided between the pair of left and right front pillars 2 and 2 and forming a front end of the vehicle interior; the floor wall portion (lower wall portion 32) extending rearward from the lower end of the front wall portion 31; the tunnel portion (tunnel member 40) formed at the middle portion of the floor wall portion in the vehicle width direction and having an upward convex shape; and the reinforcing portion laminated on and fixed to the front wall portion 31 or the front wall portion 31 and the floor wall portion, in which the reinforcing portion is provided so as to be inclined downward from the front pillar 2 toward the tunnel portion and forms a thick plate portion in collaboration with the front wall portion 31 or the front wall portion 31 and the floor wall portion.

Therefore, the vehicle front structure 1 can achieve both collision performance and space efficiency by improving the strength of the front wall portion 31 without using a frame member. The vehicle front structure 1 can be suitably applied to a vehicle type that has no space in both the power source room (engine room) and the vehicle interior (cabin).

Moreover, in the vehicle front structure 1, the reinforcing portion is formed of the plurality of reinforcing plates arranged in the vehicle width direction.

The vehicle front structure 1 can thus improve productivity by dividing the reinforcing portion into the plurality of reinforcing plates. Furthermore, the vehicle front structure 1 can suitably achieve the thick plate portion inclined downward by arranging the adjacent reinforcing plates in an offset manner such that the reinforcing plate on the inner side in the vehicle width direction is placed on a lower side.

The vehicle front structure 1 further includes the wheel arch portion 33 formed across the front wall portion 31 and the end of the floor wall portion in the vehicle width direction, and the reinforcing portion includes the wheel arch-side reinforcing plate (first reinforcing plate 50) that is provided on the side of the wheel arch portion 33 and reinforces the wheel arch portion 33, and the tunnel-side reinforcing plate (second reinforcing plate 60) that is provided on the side of the tunnel portion.

The vehicle front structure 1 can thus improve productivity by separating the wheel arch-side reinforcing plate corresponding to the wheel arch portion 33, which has a relatively complicated shape, from the tunnel-side reinforcing plate. The vehicle front structure 1 can also achieve more favorable collision performance by setting the wheel arch-side reinforcing plate with a wide protection range against collision to be larger than the tunnel-side reinforcing plate.

The vehicle front structure 1 further includes the front side frame 3 provided between the front pillar 2 and the tunnel portion and extending in the front-rear direction on at least the lower side of the floor wall portion. The wheel arch-side reinforcing plate is provided so as to straddle the front side frame 3 on the rear side of the wheel arch portion 33 and the front wall portion 31 and on the upper side of the floor wall portion, the tunnel-side reinforcing plate is provided on the lower side of the floor wall portion, and the wheel arch-side reinforcing plate and the tunnel-side reinforcing plate are connected to each other on the inner side in the vehicle width direction relative to the front side frame 3.

Therefore, the vehicle front structure 1 can suitably connect the wheel arch-side reinforcing plate to the tunnel-side reinforcing plate while avoiding the front side frame 3. Moreover, in the vehicle front structure 1, such an area of connection is provided on (near) the inner side in the vehicle width direction relative to the front side frame 3 so that, even if the wheel arch-side reinforcing plate is set to be large, the wheel arch-side reinforcing plate can be fixed to the front side frame 3, and the collision load acting on the area of connection can be reduced.

Moreover, in the vehicle front structure 1, the wheel arch-side reinforcing plate is laminated on the front wall portion 31, the floor wall portion, and the wheel arch portion 33.

The vehicle front structure 1 thus forms the ridge line having a substantially Y-shape on the wheel arch-side reinforcing plate, and can improve the strength of the wheel arch-side reinforcing plate against collision (frontal collision).

Moreover, in the vehicle front structure 1, the wheel arch-side reinforcing plate includes the flat portion 54 in the area corresponding to an intersection of the front wall portion 31, the floor wall portion, and the wheel arch portion 33.

The vehicle front structure 1 can thus prevent molding wrinkles and suitably secure the strength of the wheel arch-side reinforcing plate against collision. Moreover, in the event of a collision of a mounted part above the front wall reinforcing portion 51, the vehicle front structure 1 can disperse the collision load from the front wall reinforcing portion 51 to the lower wall reinforcing portion 52 and the wheel arch reinforcing portion 53.

Moreover, in the vehicle front structure 1, the tunnel-side reinforcing plate includes the lower wall portion (lower wall reinforcing portion 61) along the floor wall portion, and the side wall portion (tunnel reinforcing portion 62) extending upward from the inner end of the lower wall portion in the vehicle width direction, and the side wall portion (tunnel reinforcing portion 62) is fixed to the tunnel portion.

The vehicle front structure 1 can thus suitably transfer the collision load to the tunnel portion at the time of a frontal collision of the vehicle.

The vehicle front structure 1 further includes the tunnel reinforcing plates (the tunnel brace 70 and the tunnel reinforcement 80) laminated inside the tunnel portion, and the side wall portion 62 of the tunnel-side reinforcing plate is fixed to the tunnel reinforcing plate.

The vehicle front structure 1 can thus suitably transfer the collision load to the tunnel portion while preventing deformation of the tunnel portion at the time of a frontal collision of the vehicle.

The vehicle front structure 1 further includes the steering joint cover 90 laminated on at least one of the front wall portion 31 and the floor wall portion 32 so as to surround the hole 30a which is formed in at least one of the front wall portion 31 and the floor wall portion 32 and through which the steering joint is inserted, and the tunnel-side reinforcing plate has higher strength than that of the wheel arch-side reinforcing plate.

Therefore, in the vehicle front structure 1, the tunnel-side reinforcing plate has higher strength than that of the wheel arch-side reinforcing plate, and thus can secure the strength equivalent to that of the wheel arch-side reinforcing plate even if the tunnel-side reinforcing plate is reduced in size in order to provide the steering joint cover 90. This can improve the strength against collision (frontal collision of the vehicle).

The vehicle front structure 1 further includes the bracket 100 that is fixed to the tunnel-side reinforcing plate and regulates the path of the accelerator pedal.

Since the bracket 100 is fixed to the tunnel-side reinforcing plate having relatively high strength, the vehicle front structure 1 can reliably deform the bracket 100 and suitably protect the occupant (ankle) at the time of a frontal collision of the vehicle.

Moreover, in the vehicle front structure 1, a fixed portion 53a fixed to the front pillar 2 and a cutout portion 53b separated from the front pillar 2 on a lower side of the fixed portion 53*a* are formed at an end of the wheel arch-side reinforcing plate in the vehicle width direction.

The vehicle front structure 1 can thus suitably achieve the thick plate portion inclined downward while reducing the weight of the wheel arch-side reinforcing plate.

Although the embodiment of the present invention has been described above, the present invention is not limited to the above embodiment and can be appropriately modified without departing from the scope of the present invention. For example, the second reinforcing plate 60 may be joined to the side wall portion 82 of the tunnel reinforcement 80 by welding or the like instead of the tunnel brace 70. In addition, the reinforcing portions (the first reinforcing plate 50 and the second reinforcing plate 60) may be formed to be laminated on and fixed to only one of the front wall portion 31 and the lower wall portion 32, and not laminated on the other one of the front wall portion 31 and the lower wall portion 32. The reinforcing portion may also be divided into three or more portions in the vehicle width direction. Moreover, the reinforcing portion may be joined to either the left part or the right part of the dashboard lower 30.

What is claimed is:

1. A vehicle front structure comprising:
   a pair of left and right front pillars;
   a front wall portion provided between the pair of left and right front pillars and forming a front end of a vehicle interior;
   a floor wall portion extending rearward from a lower end of the front wall portion;
   a tunnel portion formed at a middle portion of the floor wall portion in a vehicle width direction and having an upward convex shape;
   a reinforcing portion laminated on and fixed to the front wall portion or the front wall portion and the floor wall portion, wherein the reinforcing portion is provided so as to be inclined downward from the front pillar toward the tunnel portion and forms a thick plate portion in collaboration with the front wall portion or the front wall portion and the floor wall portion; and
   a wheel arch portion formed across the front wall portion and an end of the floor wall portion in the vehicle width direction,
   wherein
   the reinforcing portion includes a wheel arch-side reinforcing plate that is provided on a side of the wheel arch portion and reinforces the wheel arch portion, and a tunnel-side reinforcing plate that is provided on a side of the tunnel portion,
   the tunnel-side reinforcing plate includes a lower wall portion along the floor wall portion, and a side wall portion extending upward from an inner end of the lower wall portion in the vehicle width direction,
   the side wall portion is fixed to the tunnel portion,
   the vehicle front structure comprises a tunnel reinforcing plate laminated inside the tunnel portion, and
   the side wall portion of the tunnel-side reinforcing plate is fixed to the tunnel reinforcing plate.

2. The vehicle front structure according to claim 1, further comprising
   a front side frame provided between the front pillar and the tunnel portion and extending in a front-rear direction on at least a lower side of the floor wall portion, wherein
   the wheel arch-side reinforcing plate is provided so as to straddle the front side frame on a rear side of the wheel arch portion and the front wall portion and on an upper side of the floor wall portion,
   the tunnel-side reinforcing plate is provided on the lower side of the floor wall portion, and
   the wheel arch-side reinforcing plate and the tunnel-side reinforcing plate are connected to each other on an inner side in the vehicle width direction relative to the front side frame.

3. The vehicle front structure according to claim 1, wherein
   the wheel arch-side reinforcing plate is laminated on the front wall portion, the floor wall portion, and the wheel arch portion.

4. The vehicle front structure according to claim 3, wherein
   the wheel arch-side reinforcing plate includes a flat portion in an area corresponding to an intersection of the front wall portion, the floor wall portion, and the wheel arch portion.

5. The vehicle front structure according to claim 1, further comprising
   a bracket that is fixed to the tunnel-side reinforcing plate and regulates a path of an accelerator pedal.

6. The vehicle front structure according to claim 1, wherein
   a fixed portion fixed to the front pillar and a cutout portion separated from the front pillar on a lower side of the fixed portion are formed at an outer end of the wheel arch-side reinforcing plate in the vehicle width direction.

7. A vehicle front structure comprising:
   a pair of left and right front pillars;
   a front wall portion provided between the pair of left and right front pillars and forming a front end of a vehicle interior;
   a floor wall portion extending rearward from a lower end of the front wall portion;
   a tunnel portion formed at a middle portion of the floor wall portion in a vehicle width direction and having an upward convex shape;
   a reinforcing portion laminated on and fixed to the front wall portion or the front wall portion and the floor wall portion, wherein the reinforcing portion is provided so as to be inclined downward from the front pillar toward the tunnel portion and forms a thick plate portion in collaboration with the front wall portion or the front wall portion and the floor wall portion;
   a wheel arch portion formed across the front wall portion and an end of the floor wall portion in the vehicle width direction, wherein the reinforcing portion includes a wheel arch-side reinforcing plate that is provided on a side of the wheel arch portion and reinforces the wheel arch portion, and a tunnel-side reinforcing plate that is provided on a side of the tunnel portion; and
   a steering joint cover laminated on at least one of the front wall portion and the floor wall portion so as to surround a hole which is formed in at least one of the front wall portion and the floor wall portion and through which a steering joint is inserted, wherein
   the steering joint cover is joined to the tunnel-side reinforcing plate and a lower wall portion which forms a front end of a floor surface portion, and
   the tunnel-side reinforcing plate has higher strength than that of the wheel arch-side reinforcing plate.

* * * * *